Patented Jan. 15, 1924.

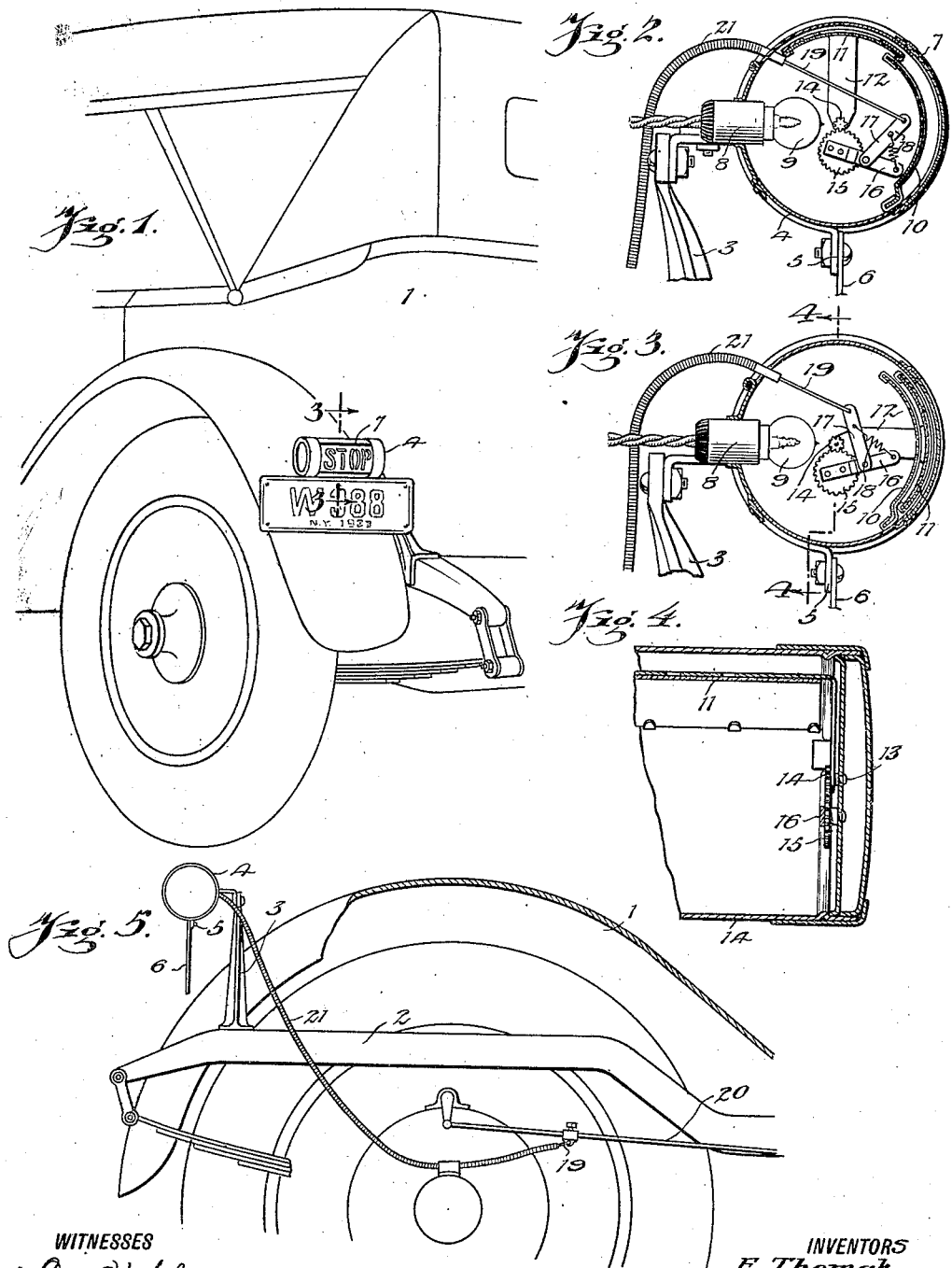

1,481,162

UNITED STATES PATENT OFFICE.

EDWARD THEMAK AND JOHN VITAGLIONE, OF NEW YORK, N. Y.

AUTOMOBILE SIGNAL.

Application filed April 18, 1922. Serial No. 554,880.

*To all whom it may concern:*

Be it known that we, EDWARD THEMAK and JOHN VITAGLIONE, citizens of the United States, and residents, respectively, of the city of New York, borough of Manhattan, in the county of New York and State of New York, and borough of Bronx, in the county of Bronx and State of New York have invented new and useful Improvements in Auto Signals, of which the following is a full, clear, and exact description.

This invention relates to improvements in automobile signals, particularly to a rear end signal of the character adapted to warn the drivers of following cars that the car carrying the signal is slowing down or about to stop.

An object of the invention is to provide a signal of this character, which will be visible either by day or by night, and a signal which will be simple and practical in construction, neat and attractive in appearance, efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:—

Figure 1 is a perspective view showing our improved signal in applied position upon the rear end of an automobile;

Figures 2 and 3 are sectional views on the line 3—3 of Figure 1 showing the signaling plate in operative and inoperative position;

Figure 4 is a fragmentary sectional view on the staggered line 4—4 of Figure 3; and Figure 5 is a view in side elevation showing the manner in which the signal is operated.

Referring in detail to the drawings, we have used the reference numeral 1 to designate an automobile provided with the usual longitudinal chassis bars 2. Upon the rear end of one of these bars we provide a bracket 3 carrying a cylinder or signal casing 4. A depending flange 5 at the bottom of the signal casing provides a convenient place of attachment for the usual license plate 6.

The cylinder or signal casing 4 is preferably painted black and is provided in its rear face with a transparent window 7. A lamp socket 8 secured in the back of the cylinder provides mounting for a lamp 9. A translucent plate of red glass 10 is located upon the inside of the cylinder in spaced relationship to the window 7 so that the window ordinarily shows a red light.

A signal plate 11 carrying cut-out letters which spell the word "Stop" is adapted to be moved in between the window and the plate 10 to warn the drivers of following cars that the car carrying the signal is slowing down. This plate 11 is secured at each end to a radial arm 12, and trunnions 13 on these arms are journaled centrally in the ends of the cylinder. A pinion 14 is fixed to one of the trunnions and turning of the pinion will effect movement of the signal plate into signaling position, as will be readily understood. We have shown one convenient means for operating the pinion, which consists of a gear wheel 15 mounted adjacent the pinion and meshing with the same. A lever 16 is carried by the gear wheel and a link 17 has a yielding connection, as indicated at 18, with the lever.

A flexible device 19, preferably connected to the brake operating rod 20 of the machine, is carried through a flexible conduit 21 and attached to the link or arm 17 so that operation of the brake pulls upon the cord, operates through the medium of the link 17, lever 16, gear wheel 15 and pinion 14 to swing the signal plate into position, so that it is exposed through the window 7 of the signal casing.

In practice the signal plate is preferably white, while the casing is dark, so that the dropping of the plate into position will catch the eye of drivers of following cars. At night the signal plate shows the word "Stop" in red letters and the blinking of the light caused by the movement of the plate into signaling position will serve to draw attention to the signal.

We have illustrated one of the preferred embodiments of the invention, but it is to be understood that numerous slight changes and alterations might be made in the general form and arrangement of the parts described without departing from the invention, and hence we do not wish to limit ourselves to the precise details set forth, but shall consider ourselves at liberty to make such slight changes and alterations as fairly fall within the spirit and scope of the appended claims.

We claim:

1. In a signal, a cylindrical casing having a window therein, a translucent plate positioned adjacent said window, a supporting member at each end of said casing and pivotally mounted therein, a signal secured to the outer ends of said supporting members and normally in an unexposed position and movable into an exposed position between said window and plate, a pinion on one of the pivots of said members, a gear wheel meshing with the pinion, a lever secured to said gear wheel, a link having a yielding connection with said lever, and means for operating said link to impart movement to said lever through said yielding connection to operate said gearing.

2. In a signal, a cylindrical casing having a window therein, a translucent plate positioned adjacent said window, a supporting member at each end of said casing and pivotally mounted therein, a signal secured to the outer ends of said supporting members and normally in an unexposed position and movable into an exposed position between said window and plate, a pinion carried by the signal, a gear wheel meshing with the pinion, a lever secured to the gear wheel, a link pivoted to the lever, a spring secured to the link and lever, and operating means secured to the link.

EDWARD THEMAK.
JOHN VITAGLIONE.